US012805518B2

(12) United States Patent
Jadhav et al.

(10) Patent No.: US 12,805,518 B2
(45) Date of Patent: Nov. 24, 2026

(54) STABLE LIQUID AGROCHEMICAL FORMULATION

(71) Applicant: UPL LTD, Haldia (IN)

(72) Inventors: Prakash Mahadev Jadhav, Lawrenceville, NJ (US); Jody Candelmo, Orefield, PA (US); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 0 days.

(21) Appl. No.: 18/984,023

(22) Filed: Dec. 17, 2024

(65) Prior Publication Data

US 2025/0113822 A1 Apr. 10, 2025

Related U.S. Application Data

(63) Continuation of application No. 17/258,525, filed as application No. PCT/IB2019/056149 on Jul. 18, 2019.

(30) Foreign Application Priority Data

Jul. 26, 2018 (IN) ............................. 201831028167

(51) Int. Cl.

| | |
|---|---|
| ***A01N 25/22*** | (2006.01) |
| ***A01N 25/02*** | (2006.01) |
| ***A01N 25/04*** | (2006.01) |
| ***A01N 25/30*** | (2006.01) |
| ***A01N 27/00*** | (2006.01) |
| ***A01N 37/36*** | (2006.01) |
| ***A01N 43/40*** | (2006.01) |
| ***A01N 47/40*** | (2006.01) |
| ***A01N 53/00*** | (2006.01) |
| ***A01P 7/00*** | (2006.01) |

(52) U.S. Cl.

CPC ............. *A01N 25/22* (2013.01); *A01N 25/02* (2013.01); *A01N 25/04* (2013.01); *A01N 25/30* (2013.01); *A01N 27/00* (2013.01); *A01N 37/36* (2013.01); *A01N 43/40* (2013.01); *A01N 47/40* (2013.01); *A01N 53/00* (2013.01); *A01P 7/00* (2021.08)

(58) Field of Classification Search

CPC ........ A01N 25/22; A01N 27/00; A01N 37/36; A01N 43/40; A01N 25/02; A01N 25/04; A01N 47/40; A01N 53/00; A01N 25/30; A01P 7/00

See application file for complete search history.

(56) References Cited

U.S. PATENT DOCUMENTS

| | | | | |
|---|---|---|---|---|
| 8,293,733 | B2 | 10/2012 | Casaña Giner et al. | |
| 8,937,054 | B1 * | 1/2015 | Martin .................. | A01N 25/10 514/844 |
| 10,011,536 | B1 | 7/2018 | Alwabel et al. | |
| 2008/0312290 | A1 | 12/2008 | Vermeer et al. | |
| 2009/0131518 | A1 * | 5/2009 | Herrick ................. | A01N 53/00 514/521 |
| 2010/0234227 | A1 | 9/2010 | Maier et al. | |
| 2012/0208700 | A1 | 8/2012 | Hopkins et al. | |
| 2016/0088835 | A1 | 3/2016 | Castelani | |
| 2018/0125064 | A1 | 5/2018 | Lindner et al. | |
| 2021/0153503 | A1 | 5/2021 | Jadhav et al. | |

FOREIGN PATENT DOCUMENTS

| | | | |
|---|---|---|---|
| BR | 102016029708 | A2 | 7/2018 |
| CN | 102113508 | A | 7/2011 |
| CN | 102986717 | A * | 3/2013 |
| CN | 102986718 | A | 3/2013 |
| CN | 107205400 | A | 9/2017 |
| WO | 2012080208 | A1 | 6/2012 |
| WO | 2018215883 | A1 | 11/2018 |

OTHER PUBLICATIONS

Chen et al., CN102986717A, Production Method of Highly Efficient Oil Suspending Agent Containing Acetamiprid and Bifenthrin, 2012, Espacenet Translation, 7 pages. (Year: 2012).*

International Search Report and Written Opinion for International Application PCT/IB2019/056149; International Filing Date: Jul. 18, 2019; Date of Mailing: Oct. 2, 2019; 10 pages.

* cited by examiner

*Primary Examiner* — Ali Soroush

*Assistant Examiner* — Andriae M Holt

(74) *Attorney, Agent, or Firm* — CANTOR COLBURN LLP

(57) ABSTRACT

A stable liquid agrochemical formulation in the form of an oil dispersion includes neonicotinoid compounds and pyrethroid compounds that are stable at low temperatures.

4 Claims, 2 Drawing Sheets

| | UTC | 5 fl oz/a | 8 fl oz/a |
|---|---|---|---|
| 4 DAA | 5.2 | 1.1 | 0.2 |
| 7 DAA | 7.1 | 1.7 | 0.5 |
| 14 DAA | 1.8 | 1.3 | 0.8 |

UTC: Untreated control: OD formulation as per Ex-1 at 5 fl oz/a and OD formulation as per Ex-1 at 8 fl oz/a.

| | UTC | 5 fl oz/a | 8 fl oz/a |
|---|---|---|---|
| 4 DAA | 6 | 1.4 | 0.2 |
| 7 DAA | 3.5 | 0.3 | 0.8 |
| 14 DAA | 3.4 | 0.1 | 0 |

UTC: Untreated control: OD formulation as per Ex-1 at 5 fl oz/a and OD formulation as per Ex-1 at 8 fl oz/a.

| | UTC | 5 fl oz/a | 8 fl oz/a |
|---|---|---|---|
| 4 DAA | 11.4 | 2.4 | 0.3 |
| 7 DAA | 10.6 | 1.9 | 0.9 |
| 14 DAA | 5.1 | 1.1 | 0.4 |

UTC: Untreated control: OD formulation as per Ex-1 at 5 fl oz/a and OD formulation as per Ex-1 at 8 fl oz/a.

STABLE LIQUID AGROCHEMICAL FORMULATION

CROSS REFERENCE TO RELATED APPLICATIONS

This application is a continuation of U.S. application Ser. No. 17/258,525, filed Jan. 7, 2021, which is a National Stage application of PCT/IB2019/056149, filed Jul. 18, 2019, which claims the benefit of priority to Indian Patent Application No. 201831028167, filed Jul. 26, 2018, all of which are incorporated by reference in their entirety herein.

FIELD OF THE INVENTION

The present invention relates to a stable liquid agrochemical formulation. The present invention more particularly relates to a stable liquid agrochemical formulation of more than one active ingredients in the form of an oil dispersion.

BACKGROUND OF THE INVENTION

Agrochemical formulations are generally designed based on customer need and the physiochemical properties of the active ingredient(s). Liquid formulations are generally preferred over solid formulations by customers due to their ease of handling in measuring, pumping, diluting and spraying operations.

Oil dispersions (OD) are one type of liquid formulation and are defined as stable suspensions of active ingredients in a water-immiscible fluid which may contain other dissolved active ingredients and is intended for dilution with water before use. OD allows the formulation of active ingredients in solid suspended form, which ingredients cannot be formulated in water because of hydrolytic instability. Recently, OD formulations have been the subject of studies by companies and formulators because of their advantages with respect to the agronomic performance in the field. In addition to customer preferences for liquid formulations, oil dispersion formulations are very suitable for the following scenarios: (1) water sensitive active ingredients, 2) compatibility issues with active ingredient mixtures and 3) the need for build-in adjuvancy.

The basic components of an agrochemical OD formulation are the solvent or oil phase and the dispersed solid phase. These basic components may include active ingredients, and agrochemically acceptable excipients such as petroleum or naturally derived solvents, safeners, rheology additives, emulsifiers, dispersants and other co-formulants that help deliver the desired attributes of the product.

Physico-chemical stability is the biggest concern while formulating OD. The above mentioned agrochemically acceptable excipients play a major role in developing stable OD formulation.

A technical challenge in the preparation of OD formulations is their preparation process per se, since the active ingredient suspended in oil phase requires dispersing agents to stabilize the system. An indication that dispersants are not acting as expected is the large increase in viscosity of the formulation during milling leading to flocculation which is simply undesirable. In addition to the preparation problem, an OD formulation may exhibit sedimentation of the active ingredient particles over time into a hard-packed non-redispersible layer or settling of the particles into the lower layers of the liquid column leading to the appearance of phase separation. This phenomenon is commonly known as "syneresis".

Both the above discussed problems further aggravate when OD is to be formulated using two or more active ingredients with different physicochemical properties. Achieving stability of such OD, when one active ingredient is present in suspended form and the other in solubilized form becomes challenging. Stability of active ingredients present in suspended form may be achieved by using anti-settling agents such as thickener that increases the viscosity of the system and acts as suspending agent by reducing the settling rate of the particles. Problem exists in stabilizing active ingredients in the solubilized form. It has been observed that stability of solubilized form may be achieved at room temperature, but active ingredients become unstable as the temperature fluctuates. In such cases, selection of solubilizing agents becomes critical to achieve physically stable OD formulation. Therefore, need exist to develop a stable OD formulation of two or more active ingredients with different physicochemical properties.

US20160088835A1 discloses an agrochemical oil dispersion comprising an active ingredient suspended in oil phase, dispersants, clay based rheological modifiers and emulsifying agents. The disclosed OD formulation achieved stability by incorporating dispersants and clay based rheological modifiers that prevents sedimentation of active ingredients suspended in the oil phase. The drawback of this prior art is that clay based rheological modifiers are prone to suspensibility drop over the period of time leading to phase separation.

Chinese Patent Application 102986718A discloses high-concentration oil-based pesticide preparation comprising acetamiprid, bifenthrin and suitable dispersant, penetrant, thickening agent, antifreezing agent, defoaming agent and vegetable oil. The disclosed formulation offers small packing dosage with significantly improved pesticide efficacy and reduced harm to a pesticide user. The process describe in this patent is not meant for bulk manufacturing.

US20080312290A1 discloses an oil based suspension concentrate of sparingly soluble active substance and a moderately soluble active substance which is present in a higher concentration than the solubility limit in the formulation. The disclosed formulation comprises a room-temperature-solid active substance from the class of neonicotinoids, a room-temperature-solid active substance from the class of pyrethroids, penetrant, vegetable oil, cyclohexanone, anionic and non-ionic surfactant and one or more additive selected from the group consisting of emulsifiers, foam inhibitors, preservative, antioxidants, spreaders, colorants and a thickener. The stability of such formulation in low temperature is unaddressed.

Although various efforts had been taken in the past to develop an OD formulation of neonicotinoids such as acetamiprid or imidacloprid and pyrethroids such as bifenthrin or cypermethrin earlier but still there is a need to provide an OD formulation of said active ingredients which is stable at low temperature. Hitherto, no attempts have been made to solve the low temperature stability of OD formulation comprising neonicotinoids and pyrethroids. The low temperature stability becomes important for OD formulations when it is intended to be used or exposed in colder regions. Precipitation of actives or freezing of the OD formulations at low temperature climatic regions will lead to practical difficulties in handling the products and will result in poor bio-efficacy. The stability, particularly low temperature stability has been of great concern when OD is exposed to various changing weather conditions. In view of the above facts, there is a need for OD formulations; in particular, formulations stable at low temperature, especially at sub-zero temperatures, while maintaining the bio-efficacy of the formulations.

OBJECTIVES OF THE INVENTION

It is an object of the present invention to provide a stable liquid agrochemical formulation of neonicotinoid compounds and pyrethroid compound which is stable at low temperature, especially at sub-zero temperature.

Another object of the present invention is to provide a process of obtaining a stable liquid agrochemical formulation of neonicotinoid compounds and pyrethroid compound which is stable at low temperature.

Another object of the present invention is to provide a stable liquid agrochemical formulation of neonicotinoid compounds and pyrethroid compound capable of acting as a pesticide.

SUMMARY OF THE INVENTION

In accordance with the above objectives, the present invention provides a stable liquid agrochemical formulation comprising:

a) at least one active ingredient in the suspended form;
b) at least one active ingredient in partly solubilized form;
c) at least a solubilizing medium allowing a higher amount of active ingredient in the partly solubilized form;
d) at least one aromatic hydrocarbon preventing the active ingredient in the partly solubilized form from freezing at sub-zero degree Celsius; and
e) optionally one or more agrochemically acceptable excipients.

In accordance with the above objectives, the present invention provides a process for preparation of a stable liquid agrochemical formulation comprising at least one active ingredient in the suspended form; at least one active ingredient in partly solubilized form; at least a solubilizing medium allowing higher amount of active ingredient in the partly solubilized form; at least an aromatic hydrocarbon preventing active ingredient in the partly solubilized form from freezing at sub-zero degree celsius; and optionally one or more agrochemically acceptable excipients wherein process comprising steps of:

a) adding at least one active ingredient to be in the partly solubilized form in the mixture of solubilizing medium and aromatic hydrocarbon;
b) adding at least one active ingredient to be in the suspended form in the mixture;
c) milling the mixture obtained in step (ii) until desired particle size is achieved.

In accordance with the above objectives, the present invention provides a use of a stable liquid agrochemical formulation as pest control solution.

In accordance with the above objectives, the present invention further provides a method of controlling unwanted pests on plants or propagation material thereof, said method comprising applying an agrochemically effective amount of stable liquid agrochemical formulation comprising at least one active ingredient in the suspended form; at least one active ingredient in the partly solubilized form; at least a solubilizing medium allowing higher amount of active ingredient in the partly solubilized form; at least an aromatic hydrocarbon preventing active ingredient in the partly solubilized form from freezing at sub-zero degree celsius; and optionally one or more agrochemically acceptable excipients; to the pests or to their locus.

Additional features and advantages of the present invention will be apparent from the detailed description that follows, which illustrates by way of example, the most preferred features of the present invention which are not to be construed as limiting the scope of the invention described herein.

DETAILED DESCRIPTION OF THE INVENTION

Figure 1:
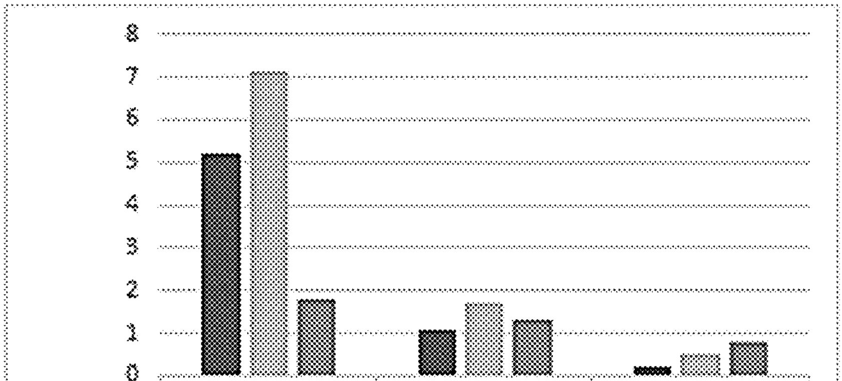
FIG. 1. Red Banded Stink Bug Adults #/25 Sweeps

In accordance with the present invention, there is provided a stable liquid agrochemical formulation of neonicotinoid compounds and pyrethroid compounds as the active ingredients formulated as oil dispersion formulation stable at low temperature.

As described herein sub-zero refers to low temperatures, especially temperatures at zero and below zero degrees celsius.

It has now been surprisingly found that an oil dispersion formulation of neonicotinoid compounds and pyrethroid compounds can be obtained by stabilizing the pyrethroid compound, being at least in partly solubilized form, with a combination of solubilizing medium and an aromatic hydrocarbon. Such a combination of solubilizing medium and aromatic hydrocarbon is found to be capable of accommodating higher amount of pyrethroid compounds in the OD formulation and impart low temperature stability to the formulation. The higher amount of pyrethroid compound is sometimes required to impart desired biological effect towards pest control.

In an embodiment, the present invention provides a liquid agrochemical formulation comprising:

a) at least one active ingredient in the suspended form;
b) at least one active ingredient in partly solubilized form;
c) at least a solubilizing medium allowing a higher amount of active ingredient in the partly solubilized form;
d) at least one aromatic hydrocarbon preventing the active ingredient in the partly solubilized form from freezing at sub-zero degree celsius; and
e) optionally one or more agrochemically acceptable excipients.

The preferred features described herein below should be interpreted such that the preferences apply either independently of one another or in combination with each other.

According to an embodiment of the present invention, the stable liquid agrochemical formulation as claimed in claim 1 wherein, said stable liquid agrochemical formulation comprising:

a) at least one active ingredient from the class of neonicotinoids in the suspended form;
b) at least one active ingredient from the class of pyrethroids in the partly solubilized form;
c) at least a solubilizing medium allowing higher amount of active ingredient in the partly solubilized form;
d) at least an aromatic hydrocarbon preventing active ingredient in the partly solubilized form from freezing at sub-zero degree celsius; and optionally one or more agrochemically acceptable excipients.

According to another embodiment of the present invention, the liquid agrochemical formulation comprises at least one active ingredient from the class of neonicotinoids such as acetamiprid, imidacloprid, clothianidin, dinotefuran, nithiazine, thiacloprid and thiamethoxam.

According to another embodiment of the present invention, the preferred neonicotinoid is acetamiprid.

In an embodiment, the neonicotinoid is imidacloprid.

In an embodiment, the neonicotinoid is thiacloprid.

In an embodiment, the neonicotinoid is thiamethoxam.

According to another embodiment of the present invention, the liquid agrochemical formulation comprises from about 0.1% to about 90% of neonicotinoid of the total weight of the liquid agrochemical formulation.

In an embodiment, the liquid agrochemical formulation comprises from about 1% to about 60% of neonicotinoid of the total weight of the liquid agrochemical formulation.

In an embodiment, the liquid formulation comprises from about 1% to about 30% of the total weight of the neonicotinoid insecticide.

In an embodiment, the liquid agrochemical formulation comprises at least one another active ingredient from the class of pyrethroids selected from the group consisting of cypermethrin, fenvalerate, permethrin, alphacypermethrin, betacypermethrin, zetacypermethrin, deltamethrin, cyflu-thrin, bifenthrin, lambda-cyhalothrin, and/or bioresmethrin and mixtures thereof.

According to an embodiment of the present invention, the pyrethroid is bifenthrin.

According to an embodiment, the pyrethroid is cypermethrin.

According to another embodiment of the present invention, the liquid agrochemical formulation comprises from about 0.1% to about 90% of pyrethroids of the total weight of the liquid agrochemical formulation.

According to an embodiment, the liquid agrochemical formulation comprises from about 1% to about 60% of pyrethroids of the total weight of the liquid agrochemical formulation.

In an embodiment, pyrethroids constitute from about 1% to about 30% of the total weight of the liquid agrochemical formulation.

In an embodiment, the liquid agrochemical formulation comprises at least one solubilizing medium.

In an embodiment of the present invention, the solubilizing medium may be selected from the group consisting of one or more paraffins selected from octane, nonane, decane, undecane, dodecane, tridecane, tetradecane, pentadecane, hexadecane, hepta-decane, octa-decane, nona-decane, eicosane, heneicosane, docosane, tricosane, tetracosane, pentacosane, and branched chain isomers thereof; petroleum, ketones (e.g. acetophenone, cyclohexanone); aromatic ethoxylate compounds selected from di- or tri-styrylphenol ethoxylates and their derivates, such as phosphates and sulphates and salts thereof. Examples of the one or more di- or tri-styrylphenol ethoxylates or derivatives thereof include, but are not limited to, ethoxylated tristyrylphenol, sulphates and phosphates of polyarylphenol ethoxylates. These sulphates and phosphates being used either in their acid forms, or as salts, such as ammonium, triethanolamine, etc. Examples of such products include: Soprophor BSU', 'Soprophor S25', Soprophor TS/10, Soprophor 4D384, Soprophor 3D33, Soprophor FL, etc.; vegetable oils (e.g. olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, tall oil); alkyl ester of vegetable oils (e.g. rapeseed oil methyl ester or rapeseed oil ethyl ester, rapeseed oil propyl esters, rapeseed oil butyl esters, tall oil fatty acids esters etc.); diesel, mineral oil, fatty acid amides (e.g. C1-C3 amines, alkylamines or alkanolamines with C6-C18 carboxylic acids), fatty acids, alkyl esters of fatty acids (e.g. C1-C4 monohydric alcohol esters of C8 to C22 fatty acids such as methyl oleate, ethyl oleate), modified vegetable oils, methanol, ethanol, propylene glycol, isopropanol, and 1,3-propanediol, glycerine, derivatives thereof or a combination thereof.

In an embodiment, the solubilizing medium may be selected from synthetically modified vegetable oils, alkyl esters of vegetable oils, modified vegetable oils and mixtures thereof.

In an embodiment, the liquid agrochemical formulation comprises from about 5% to about 90% of solubilizing medium of the total weight of the liquid agrochemical formulation.

In an embodiment, the liquid agrochemical formulation comprises from about 15% to about 80% of solubilizing medium of the total weight of the liquid agrochemical formulation.

In an embodiment, the solubilizing medium constitutes from about 20% to about 70% of the total weight of the liquid agrochemical formulation.

In an embodiment, the liquid agrochemical formulation comprises one or more aromatic hydrocarbons.

In an embodiment, the aromatic hydrocarbon according to the present invention helps stabilise and avoid freezing of the partly solubilised active ingredient at low temperature.

In an embodiment, the aromatic hydrocarbon imparting low temperature stability to the formulation may be selected from the group comprising of e.g. toluene, o-, m-, p-xylene, dodecane, n-decane, n-hexane, benzene, ethylbenzene, isopropylbenzene, tert-butylbenzene, naphthalenes, mono- or polyalkyl-substituted naphthalenes, heavy aromatic naphthalene (Aromatic 200, 100, 150) or mixtures thereof.

In an embodiment, the liquid agrochemical formulation comprises from about 0.1% to about 60% of aromatic hydrocarbon of the total weight of the liquid agrochemical formulation.

In an embodiment, the liquid agrochemical formulation comprises from about 1% to about 60% of aromatic hydrocarbon of the total weight of the liquid agrochemical formulation.

In an embodiment, the liquid agrochemical formulation comprises from about 5% to about 50% of aromatic hydrocarbon of the total weight of the liquid agrochemical formulation.

In an embodiment of the present invention, the aromatic hydrocarbon constitutes from about 10% to about 40% of the total weight of the liquid agrochemical formulation.

In an embodiment, the liquid agrochemical formulation comprises one or more rheological modifiers.

In an embodiment, the rheological modifiers may be selected from hydrophobic silica, hydrophilic silica, hydrophobic fumed silica (Aerosil R 972, Cabosil TS 610, Cabosil TS 720, HDK, Aerosil R 812), hydrophilic fumed silica (Cab-O-Sil M-5), silica gels, silicates, talc, kaolin, montmorillonite, attapulgite, pumice, sepiolite, bentonite, limestone, lime, chalk, clay, dolomite, diatomaceous earth, calcite, calcium sulfate, magnesium sulfate, magnesium sulfate, magnesium oxide, sand, ammonium sulfate, ammonium phosphate, ammonium nitrate, ureas, cereal meal, tree bark meal, wood meal, nutshell meal, and cellulose powders.

In an embodiment, the liquid agrochemical formulation comprises from about 0.5% to about 50% of rheological modifiers of the total weight of the liquid agrochemical formulation.

In an embodiment, the liquid agrochemical formulation comprises from about 1% to about 30% of rheological modifiers of the total weight of the liquid agrochemical formulation.

In an embodiment, rheological modifiers constitute from about 1% to about 20% of the total weight of the liquid agrochemical formulation.

In an embodiment, the liquid agrochemical formulation comprises one or more non-ionic surfactant or dispersing agents (also known as emulsifiers) and/or at least one or more anionic surfactant or dispersing agents.

Suitable non-ionic surfactants or dispersing agents include all substances of this type that can normally be used in agrochemical compositions. Non-ionic dispersing agents include but not limited to phosphate esters of tristyrylphenol ethoxylates (e.g., SOPROPHOR 3D33, SOPROPHOR BSU, ethoxylated triglycerides, ethoxylated aliphatic alcohols, polyalkylene oxide block copolymers of a simple primary alcohol (e.g. ethylene oxide-propylene oxide block copolymers of butanol) such as Atlas™ G-5000, Termul™ 5429 or Tergitol™ XJ, XD or XH; polyisobutene succinic anhydride-polyethylene glycol such as Atlox™ 4914; polyoxyethylenepolyoxypropylene (EO/PO) block copolymers (e.g., PLURONIC F108, ATLOX 4912, ATLAS G-5000, SYNPERONIC PE Series copolymers) and ethylene oxidepropylene oxide based acrylic acid graft copolymers such as methyl methacrylate graft copolymers (e.g., ATLOX 4913).

Anionic dispersing agents include but not limited to alkylnaphthalene sulfonates and their formaldehyde condensates (e.g., MORWET D425), polyalkylaryl sulfonates (e.g., SUPRAGIL MNS90), polymerized fatty acids (e.g., ATLOX LP-1 (12-hydroxyoctadecanoic acid homopolymer, octadecanoate), ricinoleic acid homopolymer), lignin sulfonates (e.g., ammonium lignosulfonate or sodium lignosulfonate), polyphenol sulfonates and the salts of polyacrylic acids. A further preferred group of anionic surfactants or dispersants includes the following salts that are of low solubility in vegetable oil: salts of polystyrenesulphonic acids, salts of polyvinylsulphonic acids, salts of naphthalenesulphonic acid-formaldehyde condensation products, salts of condensation products of naphthalenesulphonic acid, phenolsulphonic acid and formaldehyde, and salts of lignosulphonic acid.

Other emulsifiers added to the present composition include but not limited to polysaccharide ethers, polyglycosides, fatty acids, fatty alcohols, amine oxides, water-soluble cellulose derivatives, alkyl sulfonates, ethoxylated alkyl phenols, alkanolamides, betaines, zwitterionics, carboxylated alcohols, carboxylic acids, ethoxylated alcohols, and derivatives thereof. In certain embodiments, a composition provided herein further comprises emulsifiers, such as lauryl alcohol (e.g., Laureth-7), fatty acid diethanolamine (e.g., cocamide DEA), ammonium methyl sulfate and fatty alcohol ethoxylate (e.g., Steposol DG, Steposol ME), Tomadyne 100 surfactant, linear alcohol (C12-15) ethoxylate, POE-7, POE-3, sodium branched dodecyl benzene sulfonate, or mixtures thereof.

In an embodiment, the liquid agrochemical formulation comprises from about 0.1% to about 40% of non-ionic surfactant or dispersing agent of the total weight of the liquid agrochemical formulation.

In an embodiment, the liquid agrochemical formulation comprises from about 0.5% to about 30% of non-ionic surfactant or dispersing agent of the total weight of the liquid agrochemical formulation.

In an embodiment, non-ionic surfactant or dispersing agent constitute from about 1% to about 20% of the total weight of the liquid agrochemical formulation.

In an embodiment, the liquid agrochemical formulation comprises from about 0.1% to about 40% of anionic surfactant or dispersing agent of the total weight of the liquid agrochemical formulation.

In an embodiment, the liquid agrochemical formulation comprises from about 0.5% to about 30% of anionic surfactant or dispersing agent of the total weight of the liquid agrochemical formulation.

In an embodiment, the anionic surfactant or dispersing agent constitute from about 1% to about 20% of the total weight of the liquid agrochemical formulation.

In an embodiment, the liquid agrochemical formulation comprises one or more spreading agents.

In an embodiment, the spreading agents include but not limited to ethylene oxide/propylene oxide block copolymers, alcohol ethoxylates (such as Brij 010 and Brij 02), alkyl polysaccharides (such as Atplus 435 or AL2575), polyethoxylated alcohols/fatty alcohols (such as Synperonic A7, Etocas 35), alkyl phenyl ethoxylates (such as Agral 90), polyethoxylated nonyl phenyl ether carboxylic acid (such as Sandopan MA-18), tallow amine ethoxylates, oil based derivatives (either mineral or vegetable) (such as Atplus 411F and Atplus 463), sorbitol, ethoxylated Sorbitan derivatives (such as one of the Tween series of surfactants such as Tween 20, or Arlatone TV), acetylenic diol derivatives (such as one of the Surfynol series), esters of alkoxylated diethylethanolamine (such as Atlox 4915), and polyethyleneglycol.

In an embodiment, the liquid agrochemical formulation comprises from about 0.1% to about 30% of aromatic hydrocarbon of the total weight of the liquid agrochemical formulation.

In an embodiment, the liquid agrochemical formulation comprises from about 0.5% to about 20% of aromatic hydrocarbon of the total weight of the liquid agrochemical formulation.

In an embodiment, the aromatic hydrocarbon constitutes from about 1% to about 10% of the total weight of the liquid agrochemical formulation.

Other ingredients, such as adhesives, neutralizers, thickeners, binders, sequestrates, biocides, stabilizers, buffers preservatives, antioxidants or anti-freeze agents, may also be added to the present liquid agrochemical formulation in order to increase the stability, density, and viscosity of the described formulation.

Further, the liquid agrochemical formulation herein may be used in conjunction with one or more other agrochemicals to control a wider variety of undesirable pests. When used in conjunction with other agrochemicals, the herein described composition maybe formulated with the other agrochemicals, tank mixed with the other agrochemicals or applied sequentially with the other agrochemicals. In addition, herein described composition may, optionally, be combined with or blended with other agrochemical compositions. This blend of agrochemicals may be used to control pests in crops and non-crop environments.

In some embodiments, the liquid agrochemical formulation herein may be used in conjunction with one or more other adjuvants.

According to an embodiment, the present invention may provide stable liquid agrochemical formulation comprising acetamiprid in the suspended form, bifenthrin at least in the partly solubilized form, a solubilizing medium allowing higher amount of bifenthrin in the partly solubilized form and an aromatic hydrocarbon preventing bifenthrin being in the partly solubilized form from freezing at sub-zero degree celsius.

According to an embodiment, a stable liquid agrochemical formulation of the present invention may comprise from about 0.1% to about 90% w/w of acetamiprid, from about 0.1% to about 90% w/w of bifenthrin, from about 5.0% to about 90% w/w of solubilizing medium allowing higher amount of bifenthrin in the partly solubilized form and from about 1.0% to about 60% w/w of an aromatic hydrocarbon preventing bifenthrin being in the partly solubilized form from freezing at sub-zero degree celsius.

According to an embodiment, a stable liquid agrochemical formulation of the present invention may comprise from about 1.0% to about 30% w/w of acetamiprid, from about 1.0% to about 30% w/w of bifenthrin, from about 20% to about 70% w/w of solubilizing medium and from about 10% to about 40% w/w of an aromatic hydrocarbon.

According to an embodiment, a stable liquid agrochemical formulation of the present invention may comprise from about 1.0% to about 30% w/w of acetamiprid, from about 1.0% to about 30% w/w of bifenthrin, from about 20% to about 70% w/w of solubilizing medium and from about 10% to about 40% w/w of an aromatic hydrocarbon as oil dispersion.

According to an embodiment, a stable liquid agrochemical formulation of the present invention may comprise from about 1.0% to about 30% w/w of acetamiprid, from about 1.0% to about 30% w/w of bifenthrin, from about 20% to about 70% w/w of methylated soyabean oil and from about 10% to about 40% w/w of a solvent naphtha.

In an embodiment, the solvent naphtha is a heavy aromatic solvent consisting predominantly of aromatic hydrocarbons having carbon numbers predominantly in the range of C12-15.

In an embodiment, the present invention may provide a stable liquid agrochemical formulation comprising imidacloprid in the suspended form, cypermethrin at least in the partly solubilized form, a solubilizing medium allowing higher amount of cypermethrin in the partly solubilized form and an aromatic hydrocarbon preventing cypermethrin being in the partly solubilized form from freezing at sub-zero degree celsius.

According to an embodiment, a stable liquid agrochemical formulation of the present invention may comprise from about 1.0% to about 30% w/w of imidacloprid, from about 1.0% to about 30% w/w of cypermethrin, from about 20% to about 70% w/w of solubilizing medium and from about 10% to about 40% w/w of an aromatic hydrocarbon.

In an embodiment, the stable liquid agrochemical formulation of the present invention is an oil dispersion.

In an embodiment, the oil dispersion formulation of the invention possesses a characteristic particle size distribution.

In an embodiment, the oil dispersion formulation of the invention has a particle size distribution D10 of less than about 1.5 microns.

In an embodiment, the oil dispersion formulation of the invention has a particle size distribution D10 of less than about 1.0 microns.

In an embodiment, the oil dispersion formulation of the invention has a particle size distribution D50 of less than about 5.0 microns.

In an embodiment, the oil dispersion formulation of the invention has a particle size distribution D50 of less than about 5.0 microns.

In an embodiment, the oil dispersion formulation of the invention has a particle size distribution D50 of less than about 3.5 microns.

In an embodiment, the oil dispersion formulation of the invention has a particle size distribution D50 of less than or equal to about 3.0 microns.

In an embodiment, the oil dispersion formulation of the invention has a particle size distribution D50 of less than or equal to about 2.5 microns.

In an embodiment, the oil dispersion formulation of the invention has a particle size distribution D90 of less than or equal to about 30 microns.

In an embodiment, the oil dispersion formulation of the invention has a particle size distribution D90 of less than or equal to about 20 microns.

In an embodiment, the oil dispersion formulation of the invention has a particle size distribution D90 of less than or equal to about 10 microns.

In an embodiment, the oil dispersion formulation of the invention has a particle size distribution D100 of less than or equal to about 125 microns.

In an embodiment, the oil dispersion formulation of the invention has a particle size distribution D100 of less than or equal to about 60 microns.

In an embodiment, the oil dispersion formulation of the invention has a particle size distribution D100 of less than or equal to about 25 microns.

In an embodiment, the oil dispersion formulation of the invention has a particle size distribution D10 of less than about 1.5 microns, and D50 of less than about 5.0 microns.

In an embodiment, the oil dispersion formulation of the invention has a particle size distribution D10 of less than about 1.0 microns, and D50 of less than about 3.5 microns.

In an embodiment, the oil dispersion formulation of the invention has a particle size distribution D50 of less than or equal to about 3.0 microns, and D90 of less than or equal to about 30 microns.

In an embodiment, the oil dispersion formulation of the invention has a particle size distribution D50 of less than or equal to about 2.5 microns, and D90 of less than or equal to about 20 microns.

In an embodiment, the oil dispersion formulation of the invention has a particle size distribution D90 of less than or equal to about 10 microns, and D100 of less than or equal to about 125 microns.

According to an embodiment of the present invention, a process for preparation of a stable agrochemical formulation comprising at least one active ingredient in the suspended form; at least one active ingredient being at least in the partly solubilized form; at least a solubilizing medium allowing higher amount of active ingredient in the partly solubilized form; at least an aromatic hydrocarbon preventing active ingredient in the partly solubilized form from freezing at sub-zero degree Celsius; and optionally one or more agrochemically acceptable excipients wherein process comprising steps of:

a) adding at least one active ingredient to be in the partly solubilized form in the mixture of solubilizing medium and aromatic hydrocarbon.
b) adding at least one active ingredient to be in the suspended form in the mixture;
c) milling the mixture obtained in step (ii) until desired particle size is achieved.

According to an embodiment of the present invention, a process for the preparing a stable liquid agrochemical formulation comprises:

a) solubilizing at least one active ingredient in a mixture of solubilizing medium and aromatic hydrocarbon;

b) adding at least one dispersing agent;

c) adding at least another active ingredient to be in the suspended form; and d) milling the mixture obtained in step (c) until desired particle size is achieved.

In an embodiment, the process of the present invention comprises adding other agrochemical excipients to the mixture of step (c) before subjecting the mixture to milling.

In an embodiment, the process of the present invention comprises additional conventional steps, which may be necessary but not crucial to achieve the advantages of the present invention.

According to an embodiment of the present invention, a process for the preparing a stable liquid agrochemical formulation comprises:

1) solubilizing at least one solid low melting pyrethroid compound in the mixture of solubilizing medium and aromatic hydrocarbon;

2) adding dispersing agents;

3) adding at least one neonicotinoid compound to be in the suspended form and mix it well;

4) optionally adding other agrochemical excipients necessary to impart stability to the liquid agrochemical formulation;

5) milling the mixture obtained in step (3) until desired particle size is achieved.

According to an embodiment of the present invention, a process for preparing the liquid agrochemical formulation comprises:

1) solubilizing bifenthrin in the mixture of solubilizing medium and aromatic hydrocarbon;

2) adding dispersing agents;

3) adding acetamiprid to be in the suspended form and mix it well;

4) optionally adding other agrochemical excipients necessary to impart stability to the liquid agrochemical formulation;

5) milling the mixture obtained in step (3) until desired particle size is achieved.

According to an embodiment, the present invention provides use of stable liquid agrochemical formulation comprising at least one active ingredient in the suspended form; at least one active ingredient being at least in the partly solubilized form; at least a solubilizing medium allowing higher amount of active ingredient in the partly solubilized form; at least an aromatic hydrocarbon preventing active ingredient in the partly solubilized form from freezing at sub-zero degree celsius; and optionally one or more agrochemically acceptable excipients, as a pesticide.

In an embodiment, the liquid agrochemical formulation according to the present invention is used as insecticide.

According to another embodiment, the liquid agrochemical formulation of the present invention is found to be highly active against a wide variety of chewing, boring and sucking insects, e.g. Aphids, thrips, lepidopterous larvae, sawflies, leafminers, leafhoppers, cutworms, whiteflies, soil insects, termites and some species of bitting insects, such as rice water weevil on colarado beetle etc.

According to another embodiment, the liquid agrochemical formulation of the present invention is especially useful for the control of agricultural pests, or hygienic pests. This formulation is highly effective for the protection of growing plants including: cotton, paddy, rice forage crops, sugarcane, cole crops, leafy vegetables, tobacco, tomatoes, potatoes, flowering ornamentals, vine crops and fruit trees from the ravages of insects.

According to another embodiment of the present invention, a method of controlling or preventing unwanted pests on plants or propagation material thereof is provided, said method comprising applying an agrochemically effective amount of stable liquid agrochemical formulation according to the present invention to the pests or to their locus.

Thus, in an embodiment, the present invention may provide methods of controlling or preventing unwanted pests on plants or propagation material thereof, said method comprising application of an agrochemically effective amount of a stable liquid agrochemical formulation comprising:

a) at least one active ingredient in the suspended form;

b) at least one active ingredient in the partly solubilized form;

c) at least a solubilizing medium allowing higher amount of active ingredient in the partly solubilized form;

d) at least an aromatic hydrocarbon preventing active ingredient in the partly solubilized form from freezing at sub-zero degree celsius;

and optionally one or more agrochemically acceptable excipients.

In an embodiment, the present invention provides methods of controlling insect pest such as wide variety of chewing, boring and sucking insects, e.g. Aphids, thrips, lepidopterous larvae, sawflies, leafminers, leafhoppers, cutworms, whiteflies, soil insects, termites and some species of biting insects, such as rice water weevil on colorado beetle etc.

In an embodiment of the present invention, a kit is provided, said kit comprising:

a) at least one active ingredient in the suspended form;

b) at least one active ingredient in the partly solubilized form;

c) at least a solubilizing medium allowing higher amount of active ingredient in the partly solubilized form;

d) at least an aromatic hydrocarbon preventing active ingredient in the partly solubilized form from freezing at sub-zero degree celsius;

and optionally one or more agrochemically acceptable excipients;

wherein said kit is used as a pesticide.

Example 1

A stable liquid agrochemical formulation was made according to following procedure:

A methyl oleate and methyl linoleate admixture, solvent naphtha, and colloidal silicon dioxide (fumed silica) was added to a vessel and mixed until the fumed silica was in solution. Under stirring, bifenthrin was charged. Stirring was maintained until the bifenthrin was completely solubilized. The non-ionic and anionic dispersing agents were added while stirring to obtain the blend. Acetamiprid was then added to the blend and stirred for at least an hour. The blend thus obtained was subjected to milling under controlled conditions (temperature not to exceed beyond 20 °C during milling) to achieve the desired particle size. Once, particle size had been achieved, a complete homogeneous OD formulation was obtained.

| Ingredients | Quantity (%) |
|---|---|
| Acetamiprid | 11.88 |
| Bifenthrin | 18.33 |
| Solvent naphtha | 15 |
| Colloidal silicon dioxide | 3 |
| Ethylene oxide-propylene oxide block copolymers | 1-15 |
| Methyl oleate/linoleate methyl ester | q.s. |
| | 100.00 |

Example 2

| Ingredients | Quantity (%) |
|---|---|
| Acetamiprid | 11.9 |
| Bifenthrin | 18 |
| Aromatic 200 ND | 10 |
| Fumed silica | 3 |
| Polyisobutene succinic anhydride-polyethylene glycol | 1-15 |
| Rapeseed oil methyl ester | q.s. |
| | 100.00 |

The OD formulation including acetamiprid, bifenthrin and other excipients in a given ratio shown above was prepared as per the process of Example 1.

Example 3

| Ingredients | Quantity (%) |
|---|---|
| Acetamiprid | 11.9 |
| Bifenthrin | 18 |
| Aromatic 150 ND | 20 |
| Fumed silica | 3 |
| Polyoxyethylenepolyoxypropylene (EO/PO) block copolymers | 1-15 |
| Sodium branched dodecyl benzene sulfonate | q.s. |
| | 100.00 |

The OD formulation including acetamiprid, bifenthrin and other excipients in a given ratio shown above was prepared as per the process of Example 1.

Example 4

| Ingredients | Quantity (%) |
|---|---|
| Acetamiprid | 11.9 |
| Bifenthrin | 18 |
| Aromatic 200 ND | 20 |
| Bentonite | 2 |
| Alkylnaphthalene sulfonates | 1-15 |
| Soyabean oil methyl ester | q.s. |
| | 100.00 |

The OD formulation including acetamiprid, bifenthrin and other excipients in a given ratio shown above was prepared as per the process of Example 1.

Example 5

| Ingredients | Quantity (%) |
|---|---|
| Acetamiprid | 11.9 |
| Bifenthrin | 18.36 |
| Aromatic 150 ND | 15 |
| Fumed silica | 3 |
| Ethylene oxide-propylene oxide block copolymers | 1-15 |
| Methyl oleate/linoleate methyl ester | q.s. |
| | 100.00 |

The OD formulation including acetamiprid, bifenthrin and other excipients in a given ratio shown above was prepared as per the process of Example 1.

Example 6

| Ingredients | Quantity (%) |
|---|---|
| Acetamiprid | 15.1 |
| Bifenthrin | 15.1 |
| Aromatic 200 ND | 15 |
| Fumed silica | 3 |
| Tristyrylphenol ethoxylates | 1-15 |
| Cyclohexanone | q.s. |
| | 100.00 |

The OD formulation including acetamiprid, bifenthrin and other excipients in a given ratio shown above was prepared as per the process of Example 1.

Example 7

| Ingredients | Quantity (%) |
|---|---|
| Acetamiprid | 18.0 |
| Bifenthrin | 12.0 |
| Aromatic 150 ND | 15.0 |
| Bentonite | 3.0 |
| Ethylene oxide-propylene oxide block copolymers | 1-15 |
| Methyl oleate/linoleate methyl ester | q.s. |
| | 100.00 |

The OD formulation including acetamiprid, bifenthrin and other excipients in a given ratio shown above was prepared as per the process of Example 1.

Determination of Viscosity

The viscosity of the formulations of Example 2, Example 3 and Example 4 was measured as per CIPAC MT 22.1. The measurement of dynamic viscosity is carried at room temperature. Sample to be tested for viscosity was kept undisturbed for 1 hour before measurement. The viscosity of the liquid agrochemical formulation was determined to be 350-600 cps.

| Examples | Viscosity |
|---|---|
| Example 2 | 432 |
| Example 3 | 568 |
| Example 4 | 506 |

Study of Effect of the Presence of Aromatic Hydrocarbon in the OD Formulation

To observe the effect of aromatic hydrocarbon in the stabilization of OD formulation developed according to the present invention, a comparative study was performed wherein EXAMPLE-8 was developed with aromatic 200 ND (solvent naphtha) inclusion and EXAMPLE-9 was developed wherein all the ingredients similar to Example-8 were present excluding aromatic 200 ND. Table-1 shows the stability of these formulations over temperature range.

TABLE 1

| Ingredients | Example 8 (With Aromatic 200 ND) | Example 9 (Without Aromatic 200 ND) |
|---|---|---|
| Acetamiprid | 11.9 | 11.9 |
| Bifenthrin | 18.0 | 18.0 |
| Aromatic 200 ND | 15.0 | 0.0 |
| Silica | 3.0 | 3.0 |
| Tristyrylphenol ethoxylates | 6.5 | 5.5 |
| Methyl oleate/linoleate methyl ester | q.s. | q.s. |

| | Room Temp | 0 °C for 1 Week | 54 °C for 2 Weeks | Room Temp | 0 °C for 1 Week | 54 °C for 2 Weeks |
|---|---|---|---|---|---|---|
| d10 μm | 0.878 | 0.813 | 0.723 | 0.615 | 1.318 | 0.62 |
| d50 μm | 2.266 | 3.109 | 3.529 | 4.336 | 25.76 | 3.344 |
| d90 μm | 8.193 | 7.983 | 10.59 | 17.8 | 81.57 | 26.19 |
| d100 μm | 22.73 | 111 | 52.63 | 52.63 | 194.2 | 111 |
| Viscosity | 375 | 364 | 238 | 314 | 0 | 168 |
| Bleeding | No | No | <1 cm | No | No | 0.5 cm |
| Visual Observation | Cream Color Suspension | Cream Color Suspension | Cream Color Suspension | Cream Color Suspension | Solid | Cream Color Suspension |

Conclusion: As observed from the Table-1, Example-8 exhibited stability across temperature range noted by particle size growth minimization. The viscosity showed a decrease at 0 °C and 54 °C but not to a significant degree. 54 °C sample showed minimal bleed of <1 cm. Water miscibility demonstrated good dispersion and only slight sedimentation that remixed easily. 0 °C sample remained liquid throughout testing period.

As observed from the Table-1, Example-9 showed particle size growth across temperature range. 0 °C sample remained solidified throughout testing period. Viscosity of room temp product was low and the stability samples showed even lower viscosity. Water miscibility was fair with some sedimentation. 0 °C sample was not able to be reconstituted upon thaw.

Test for Low Temperature Stability

The OD formulation according to the present invention was tested for storage stability. The OD formulation according to the present invention was tested for stability as per CIPAC guideline at different temperature. Observations of samples for 25 °C and 0 °C after 7 days has been summarised in below:

TABLE 2

| Formulation Example no. | Appearance at 25 °C after 7 days | Appearance at 0 °C after 7 days |
|---|---|---|
| Example 5 | Cream Color Suspension | Cream Color Suspension |
| Example 8 | Cream Color Suspension | Cream Color Suspension |
| Justice OD, commercial sample | Cream Color Suspension | Solidified |

Conclusion: As observed from the Table-2, Example-5 and Example-8 exhibited stability across temperature range noted by visual inspection as a cream colored suspension without any sign of sedimentation. The viscosity showed decrease at 0 °C but not to a significant degree. Water miscibility demonstrated good dispersion and only slight sedimentation that remixed easily. 0 °C sample remained liquid throughout testing period.

The OD formulation so developed was tested against marketed product named JUSTICE. The technical quantities in the JUSTICE are 13% Acetamiprid and 10% Bifenthrin. It remained solidified thought out the 0 °C stability testing period. Marketed product's viscosity was less than 1 across all temperature stability testing which also affect the water miscibility and dispersion. Product showed no dispersion and exhibited creaming. Product kept at 0 °C was not able to be reconstituted upon thaw.

Test for Storage Stability

The OD stability of the formulations according to the present invention was tested after 24 hrs of dilution and the results are summarised below:

TABLE 3

| Ingredients | Exm-2 | Exm-3 | Exm-4 |
|---|---|---|---|
| Viscosity | 432 | 568 | 506 |
| Density | 1.01 | 1.03 | 1.01 |
| Wet sieve (100 mesh) | 0.01 | 0.01 | 0.01 |
| Wet sieve (325 mesh) | 0.1 | 0.15 | 0.02 |
| Lumisizer separation index | 0.708 | 0.290 | 1.02 |

TABLE 3-continued

| Ingredients | Exm-2 | Exm-3 | Exm-4 |
|---|---|---|---|
| Stability RT 1 Day | Uniform Dispersion | Uniform Dispersion | Uniform Dispersion |
| Stability 54 °C 14 Days | Uniform Dispersion | Uniform Dispersion | Uniform Dispersion |
| Observations related to syneresis | Solidification at 0 °C | Less than 1 ml | Less than 1 ml |

The viscosity of OD formulation is highly critical. Even a slight increase in viscosity of the liquid phase causes active ingredients to fall out of suspension and form a layer at the bottom of the storage container. This leads to Syneresis (phase separation) and is measured as the amount of top-clearing due to phase separation. Inventors of the present invention overcome syneresis problem by carefully selecting the right amount of emulsifying agents and aromatic hydrocarbon. Composition of Ex-2 prepared according to the present invention remained stable during ambient and AHS study but it become solidify at zero-degree Celsius. Ex-3 and Ex-4 did not show any syneresis and remain stable as uniform dispersion throughout the study period.

Biological Efficacy of OD Formulation

Crop Selected (pest infested): Soybean

Targeted Pests: Red Banded Stink Bug

Objective of trial: To evaluate the performance of OD Formulation.

Treatments: 2.52 Lb/Gal

Spray Volume: 5 fl oz/a and 8 fl oz/a

Method adopted: Sweep Net Test

TABLE 4

| No. | Name | Concentration (LB/GAL) | Type | Rate lb (ai/a) | Rate (fl oz/a) |
|---|---|---|---|---|---|
| 1 | Untreated Check | | | | |
| | | Trial 1 | | | |
| 2 | Formulation as per Example-1 | 2.52 | SC | 0.098 | 5 |
| | Bifenthrin | 1.52 | | 0.059 | |
| | Acetamiprid | 1 | | 0.039 | |
| | | Trial 2 | | | |
| 3 | Formulation as per Example-1 | 2.52 | SC | 0.158 | 8 |
| | Bifenthrin | 1.52 | | 0.095 | |
| | Acetamiprid | 1 | | 0.063 | |

The OD formulation prepared according to the present invention was taken for performance evaluation in controlling Redbanded Stink Bug (RBSB) pest on soybean crops. The RBSB, *Piezodorus guildinii*, is a Neotropical stink bug. The RBSB feeds on many leguminous plants including several economically important crops such as beans, peas, alfalfa, and lentils. The RBSB has become one of the most significant pests of soybean.

2.52 Lb/Gal OD formulation was prepared and sprayed onto soyabean crops at two different rates, one at 5 (fl oz/a) and other at 8 (fl oz/a). The efficacy performance was tested against the untreated control i.e. soybean crops without any treatment. Trial 1 of OD formulation was taken wherein 5 (fl oz/a) spray which amounts to 0.098 lb (ai/a) of OD formulation with 0.059 lb (ai/a) of bifenthrin and 0.039 lb (ai/a) of acetamiprid. Similarly, in Trial 2, the OD formulation was taken wherein 8 (fl oz/a) spray which amounts to 0.158 lb (ai/a) of OD formulation with 0.095 lb (ai/a) of bifenthrin and 0.063 lb (ai/a) of acetamiprid.

Sweep net test was adopted as a method to estimate efficacy of OD formulation on RBSB. A sweep net is a funnel-shaped net attached to a long-handled frame that is swept back and forth through the foliage. Insects captured in the net are then counted. With RBSB species, the treatment threshold for soybeans is 9 per 25 sweeps.

FIG. 1 shows the performance of OD formulation on Redbanded Stink Bug Adults. The observations were made on 4th, 7th and 14th day after application. It was observed that OD formulation gave effective control of RBSB adults, both at 5 (fl oz/a) and 8 (fl oz/a).

Figure 2:
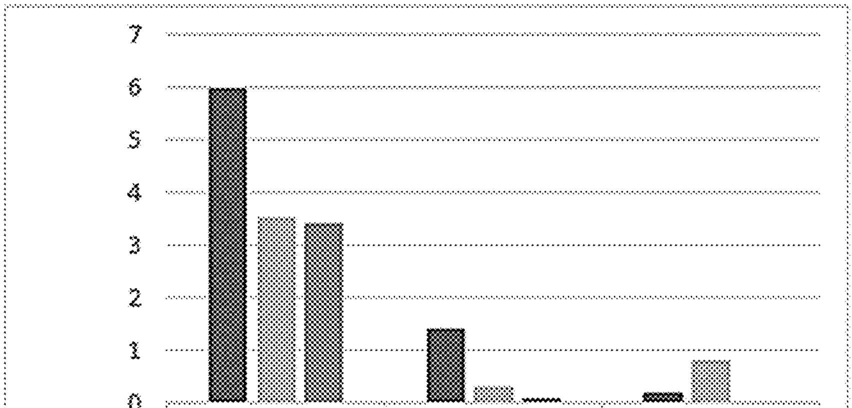
FIG. 2 Red Banded Stink Bug Nymphs #/25 Sweeps

Similarly, OD formulation was sprayed on Redbanded Stink Bug Nymphs. The observations (FIG. 2) were made on 4th, 7th and 14th day after application. On RBSB Nymphs also OD formulation gave high control, both at 5 (fl oz/a) and 8 (fl oz/a).

Figure 3:
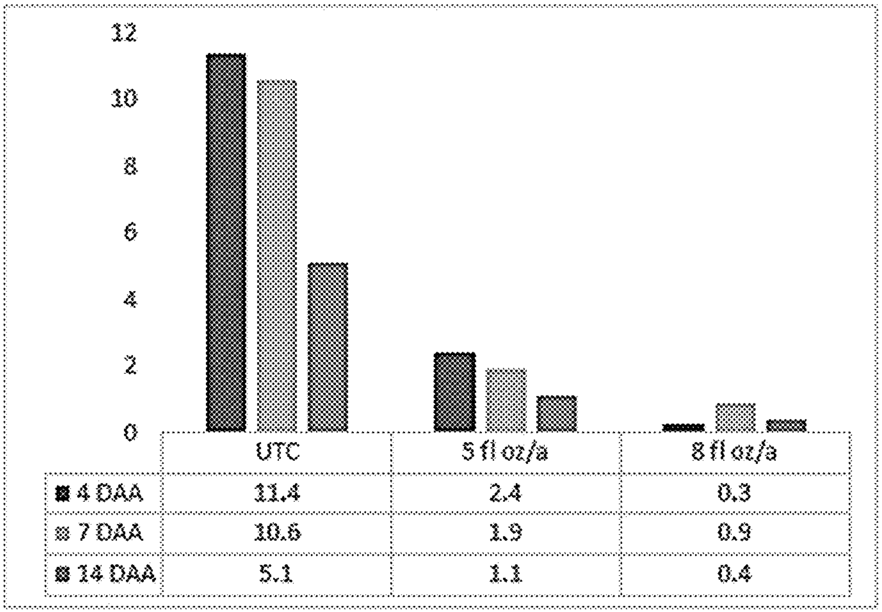
FIG. 3 Red Banded Stink Bug Adults+Nymphs #/25 Sweeps

FIG. 3 shows the observations made on combined population of RBSB Adults and RBSB Nymphs on 4th, 7th and 14th day after application. On the combined population of RBSB adults and Nymphs, the OD formulation gave high control, both at 5 (fl oz/a) and 8 (fl oz/a).

It was concluded that all treatments planned in various concentration rates with the OD formulation developed according to the present invention found to be effective. OD formulation at 8 (fl oz/a) showed the best control of RBSB nymphs on 4DAA (4 day after application). At 7DAA, all treatments had lower RBSB populations (adult and nymph) than the untreated check. And at 14 DAA, all treatments had fewer nymphs than the untreated check. This concludes that the OD formulation developed according to the present invention found to be very effective in controlling RBSB population on soybean crop.

What is claimed is:

1. A stable liquid agrochemical formulation comprising:

(a) acetamiprid in a suspended form present in an amount of 1-30% by weight of the formulation;

(b) bifenthrin in a partly solubilized form present in an amount of 1-30% by weight of the formulation;

(c) at least a solubilizing medium, wherein the solubilizing medium is an alkyl ester of a vegetable oil and provides a higher amount of the bifenthrin in the partly solubilized form present in an amount of 1-40% by weight of the formulation;

(d) at least one C9-C15 heavy aromatic hydrocarbon effective to prevent the bifenthrin in the partly solubilized form from freezing at sub-zero degrees Celsius present in an amount of 1-40% by weight of the formulation;

(e) a dispersing agent selected from tristyrylphenol ethoxylates, polyalkylene oxide block copolymers of a primary alcohol, alkylnaphthalene sulfonates present in an amount of 1-20% by weight of the formulation;

(f) hydrophobic fumed silica at present in an amount of 1-10% by weight of the formulation; and, (g) optionally one or more agrochemically acceptable excipients, wherein said formulation is stable at a temperature below 0 °C, and wherein said formulation has a particle size distribution $D_{10}$ of less than about 1.5 microns, a $D_{50}$ of less than about 5.0 microns and a $D_{90}$ of less than or equal to about 30 microns.

2. A process for preparation of the stable liquid agrochemical formulation according to claim 1, comprising:

(i) adding the bifenthrin to be in the partly solubilized form to a mixture of the solubilizing medium and the C9-C15 heavy aromatic hydrocarbon;

(ii) adding the acetamiprid to be in the suspended form in the mixture; and (iii) milling the mixture obtained in step (ii).

3. A method of controlling or preventing unwanted pests on plants or propagation material thereof, said method comprising applying an agrochemically effective amount of the stable liquid agrochemical formulation of claim 1 to the pests or to their locus.

4. A stable liquid agrochemical formulation consisting of:

acetamiprid in a suspended form, present in an amount from 11.9% to 18.0% by weight of the formulation;

bifenthrin in a partly solubilized form, present in an amount from 12.0% to 18.36% by weight of the formulation;

a solubilizing medium, wherein the solubilizing medium is an alkyl ester of a vegetable oil and is present in an amount sufficient to constitute the balance of the formulation;

at least one C9-C15 heavy aromatic hydrocarbon effective to prevent the bifenthrin in the partly solubilized form from freezing at sub-zero degrees Celsius, present in an amount from 10% to 20% by weight of the formulation;

a dispersing agent selected from tristyrylphenol ethoxylates, polyalkylene oxide block copolymers of a primary alcohol, and alkylnaphthalene sulfonates, present in an amount from about 1% to about 15% by weight of the formulation;

hydrophobic fumed silica present in an amount from 2% to 3% by weight of the formulation; and, optionally, one or more agrochemically acceptable excipients;

wherein said formulation is stable at a temperature below 0 °C; and, wherein said formulation has a particle size distribution D10 of less than about 1.5 microns, a D50 of less than about 5.0 microns, and a D90 of less than or equal to about 30 microns.

* * * * *